United States Patent

Flowers

[11] Patent Number: 5,774,543
[45] Date of Patent: Jun. 30, 1998

[54] TELEPHONE JACK SECURITY DEVICE

[76] Inventor: Calvin Flowers, 8135 S. Ada, Chicago, Ill. 60620

[21] Appl. No.: 555,887

[22] Filed: Nov. 13, 1995

[51] Int. Cl.[6] ........................................ H04M 1/00
[52] U.S. Cl. .................... 379/441; 379/445; 379/451; 379/198; 200/43.02
[58] Field of Search ................... 379/441, 445, 379/451, 200, 442, 198, 199, 189, 437, 457; 200/43.02; 439/135, 133, 521, 533; D13/152, 156; D14/140, 240; 380/6, 21

[56] References Cited

U.S. PATENT DOCUMENTS

| | | | |
|---|---|---|---|
| 4,297,534 | 10/1981 | Epstein et al. | 379/442 |
| 4,311,883 | 1/1982 | Kidney | 379/455 |
| 4,584,856 | 4/1986 | Petersdorff et al. | 70/57 |
| 4,683,583 | 7/1987 | Kosser | 379/200 |
| 4,853,960 | 8/1989 | Smith | 379/437 |
| 4,924,512 | 5/1990 | Sizemore et al. | 380/6 |
| 4,965,459 | 10/1990 | Murray | 379/189 |
| 5,119,419 | 6/1992 | McDaid | 379/445 |
| 5,297,199 | 3/1994 | Graham et al. | 379/441 |
| 5,305,380 | 4/1994 | Hileman et al. | 379/445 |

FOREIGN PATENT DOCUMENTS 538948  6/1956  Italy .............................. 379/445

*Primary Examiner*—Dwayne Bost
*Assistant Examiner*—Keith Ferguson
*Attorney, Agent, or Firm*—Denison & Assocs, PC

[57] ABSTRACT

A standard phone jack is provided with a lock cylinder having a rotatable contact arm which is capable of rotating between a first open circuit position when in its locked position and a second closed circuit position where it engages a wire contact to provide access to a dial tone. In such a manner, it completely cuts off all access to the outgoing phone line when locked so that no calls may be made or received by unauthorized users, nor can charge calls or collect calls be accepted by unauthorized users.

5 Claims, 1 Drawing Sheet

5,774,543

TELEPHONE JACK SECURITY DEVICE

FIELD OF THE INVENTION

The present invention relates to the area of telephone security devices phone line equipment and more particularly to a standard telephone jack which has been provided with a rotatable lock which severs all connection with incoming lines such that phone calls cannot be made or received unless the authorized user inserts the corresponding key to close the circuit.

BACKGROUND OF THE INVENTION

Although there are numerous telephone security devices in the prior art, none provides a simple, inexpensive lockable telephone jack which blocks both incoming and outgoing calls. With all the prior art devices, they either lock the telephone jack completely, so that the user must remove the line and then lock the device, or they block outgoing calls only. In cases where telephone dial tones are scrambled to render them useless, these devices require additional expensive circuitry. Regardless, as long as incoming calls can be received, the recipient will always be capable of accepting charge calls and collect calls, all to the detriment of the phone number owner. Additionally, the present jack can be used in public situations where the phone number owner does not want anyone else to pick up phone calls when she or he is not present. Thus, it is well adapted to residential situations were families share housing and do not want others accepting collect or charge calls in the phone number owner's absence. Modern phone company voice mail records any incoming messages when there is no phone attached to a line.

For example, U.S. Pat. No. 4,311,883 issued to Kidney discloses a device that includes a modular telephone jack with a lock that secures the jack to the wall socket. The device also includes a clamp to secure the telephone extension cord to the plugged in telephone jack so that no calls may be made when the telephone jack is inserted into the wall. However, to use the telephone according to this disclosure, one must unlock the jack, remove the jack from the wall, and then plug the telephone extension cord into the wall socket.

Petersdorf, U.S. Pat. No. 4,584,856 discloses a protective cover that fits over the telephone jack and is then locked into place. To connect a telephone it is necessary to unlock and remove the protective cover which is an unnecessary nuisance.

Murray, U.S. Pat. No. 4,965,459 discloses a telephone line security system which prohibits outgoing telephone calls to telephone numbers containing prohibited combinations of digits. However, it does not cut off telephone access completely, and others may accept collect or charge calls to that number.

Hileman, U.S. Pat. No. 5,305,380 discloses a device for preventing unauthorized access to modular telephone jacks. The device operates by removal of the telephone wire from the jack and erecting a physical barrier about the wall socket.

Thus, nowhere is it seen in the prior art a telephone jack locking system which is comprised of a standard jack and rotatable lock which is capable of cutting off complete access to a phone line resulting in a very high level of security and comfort for the telephone owner.

SUMMARY OF THE INVENTION

The present invention consists of an improved telephone line security system wherein a standard telephone jack is equipped with a rotatable lock having an extended contact arm which moves between a first open circuit position and a second closed circuit position such that when the arm is in the open position the telephone circuitry is broken and no calls may be made or received. Conversely, when the contact arm is in the second closed position, the telephone circuitry is connected and a dial tone may be received.

Thus, it is an object of the present invention to provide a telephone security device which completely cuts off all incoming and outgoing calls which has a simple rotating lock with an extended contact arm which moves between a first open position and a second closed position such that the operator of the lock can cut off all access to the phone line.

It is a further object of the present invention to provide a telephone security device which is simple and effective to use and which may be comprised of standard parts which require no new tooling, nor should be much more expensive than individual components combined, that is a basic rotating lock and a standard telephone jack.

It is a yet a further object of the present invention to provide a telephone security device which moves an extended contact arm between a first open position and a second closed position wherein the telephone line may be secured without physically removing the telephone line from the wall.

Additionally, it is an object of the present invention to provide a telephone security device which secures the phone jack from unauthorized use by utilizing a permanently secured cover or one which has a non-reversible fastener in order to prevent tampering by unauthorized users.

These and other objects and advantages of the present invention may be readily derived from the following detailed description of the drawings taken in conjunction with the accompanying drawings present herein and should be considered as within the overall scope of the invention.

DETAILED DESCRIPTION OF THE DRAWINGS

Figure 1:
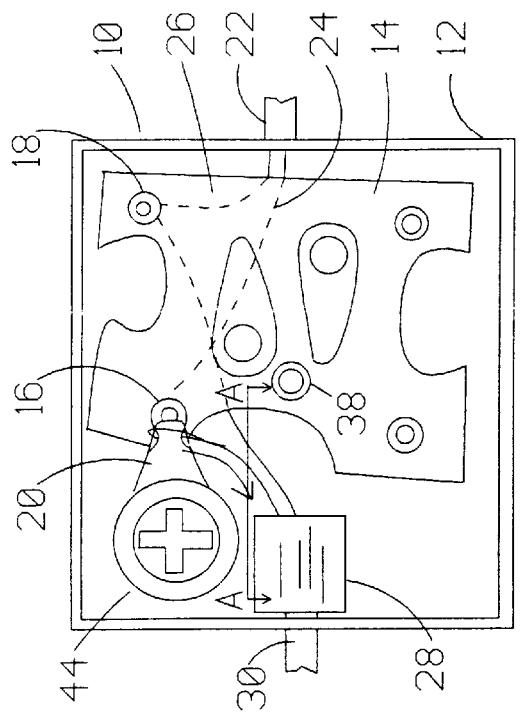
FIG. 1 shows the interior detail of the phone jack box comprising the instant invention.

FIG. 1 shows the interior detail of phone jack 10 showing the interior of phone jack cover 12 with is outfitted with a standard assembly with the addition of rotatable lock 44. In this view, the phone jack 10 has been removed from the wall to show its interior detail. Rotatable lock 44 is a standard device which is readily available in the marketplace for a modest cost. This is likewise true for phone jack 10.

FIG. 1 clearly shows how rotatable arm 20 may move between a first, open circuit position not in contact with any terminal or circuit when it is in its locked position, and a second closed circuit position in contact with ground wire contact 16. The phone jack is equipped with transmission wire 26 which is connected to both integral phone jack line 22 and incoming phone line 30. Ground wire 24 completes the circuit and is connected, via rotatable arm 20, to incoming phone line 30 and integral phone jack line 22.

Both the transmission wire contact 18 and the ground wire contact 16 are retained within contact retainer plate 14, which is preferably composed of a plastic or other copolymer. Rotatable arm 20 is preferably comprised of a highly conductive metal such as copper or aluminum so as to readily transmit low voltage voice or data signals. A cover fastener threaded bore 38 is also provided within contact retainer plate 14 to receive and secure the cover fastener 36. A phone line receptacle 28 at one end of phone jack 10 is adapted to receive the standard terminal plug of incoming phone line 30.

Figure 2:
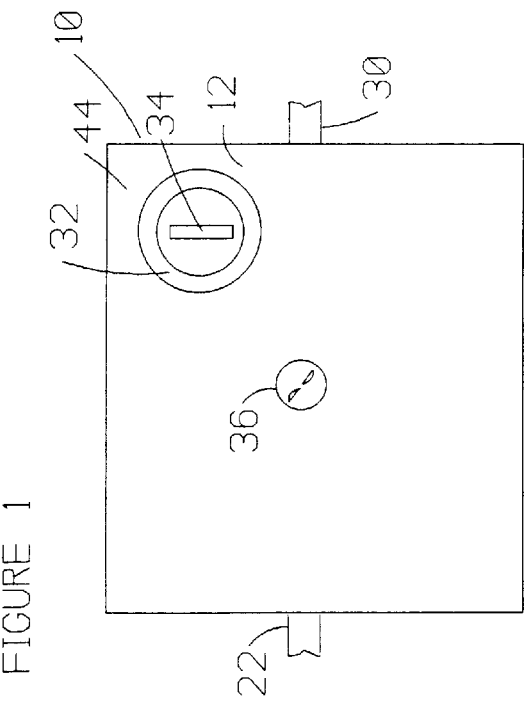
FIG. 2 shows the exterior of the phone jack box of the present invention.

FIG. 2 shows phone jack 10 with phone jack cover 12 secured in place via means of non-reversible cover fastener 36. In such a manner, this makes it impossible for any unauthorized user to tamper with the phone lines to obtain access to make or receive calls. FIG. 2 also shows integral phone jack line 22 extending from the box which leads to phone lines coming into the room, and incoming phone line 30 which leads to the phone itself. Rotatable lock 44 is held in place by means of lock plate 32. A corresponding key is readily inserted into keyhole 34.

Figure 3:
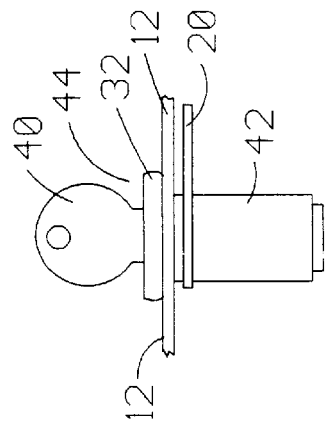
FIG. 3 shows a side elevational view of the detail of the rotatable lock taken along line A—A of FIG. 1.

FIG. 3 shows the detail of rotatable lock 44 in side elevation taken along line A—A of FIG. 1. Corresponding key 40 has been inserted into the rotatable lock 44. Lock plate 32 holds lock 44 in place against phone jack cover 12. Lock cylinder 42 is firmly secured to rotatable arm 20 which is capable of moving between its free open circuit position and its closed circuit position when it is engaged with ground wire contact 16 as shown in FIG. 1.

Figure 4:
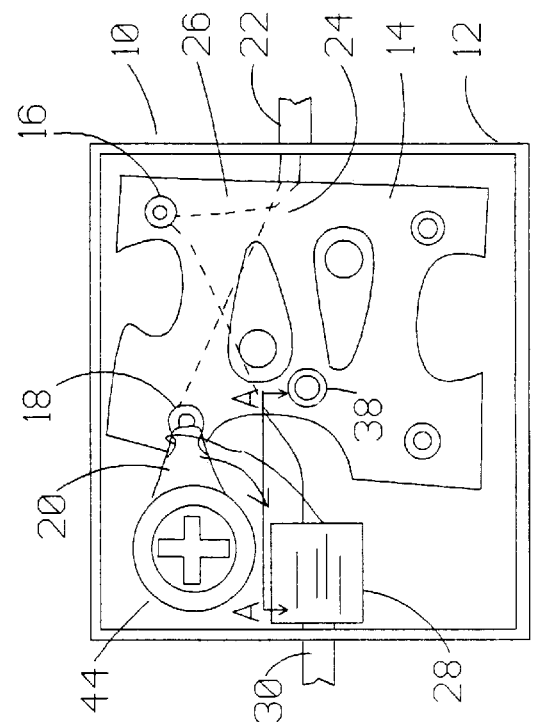
FIG. 4 shows an alternative embodiment of the present invention wherein the transmission wire contacts with the rotatable arm in lieu of the ground wire.

FIG. 4 shows an alternative embodiment of the present invention in which phone jack 10 has been rewired so that rotatable arm 20 swings freely between transmission wire contact 18 in its closed circuit position and its locked position away from any terminal or contact. In such a manner, the circuit between transmission wire 22 may be broken when the phone is locked rather than ground wire 24 as shown in FIG. 1.

Although in the foregoing detailed description the present invention has been described by reference to various specific embodiments, it is to be understood that modifications and alterations in the structure and arrangement of those embodiments other than those specifically set forth herein may be achieved by those skilled in the art and that such modifications and alterations are to be considered as within the overall scope of the invention.

What is claimed is:

1. A locking phone jack apparatus having a phone jack assembly, a rotatable lock with a contact arm, a wire contact, a ground wire, a transmission wire carrying a dial tone, a standard phone line receptacle connected to both the transmission wire and the ground wire, and an integral phone jack line connected to the phone jack wherein the rotatable lock is capable of swinging between a first open circuit position while in its locked position to a second closed circuit position when it engages a wire contact hence enabling access to the dial tone.

2. The apparatus according to claim 1 wherein the wire contact is a ground wire contact.

3. The apparatus according to claim 1 wherein the wire contact is a transmission wire contact.

4. The apparatus according to claim 1 wherein the rotatable arm is made of one of the following: aluminum or copper.

5. A locking phone jack apparatus having;

a standard phone jack assembly with a phone jack box cover, a non-reversible fastener securing the phone jack box cover to the phone jack assembly, a rotatable lock with a contact arm made from either aluminum or copper, or an alloy of either, with the contact arm further having a ground or transmission wire contact, a ground wire, a transmission wire carrying a dial tone, a standard phone line receptacle connected to both the transmission wire and the ground wire, an integral phone jack line connected to the phone jack wherein the rotatable arm is capable of swinging between a first open circuit position to a second closed circuit position enabling the apparatus to selectively allow access to and from the dial tone.

* * * * *